US011397970B2

(12) United States Patent
Peleg

(10) Patent No.: US 11,397,970 B2
(45) Date of Patent: Jul. 26, 2022

(54) VISUAL DESIGNATION OF A ZONE IN RENDERED CODE

(71) Applicant: Roy Peleg, Tel Aviv (IL)

(72) Inventor: Roy Peleg, Tel Aviv (IL)

(*) Notice: Subject to any disclaimer, the term of this patent is extended or adjusted under 35 U.S.C. 154(b) by 47 days.

(21) Appl. No.: 16/587,704

(22) Filed: Sep. 30, 2019

(65) Prior Publication Data

US 2020/0027136 A1 Jan. 23, 2020

Related U.S. Application Data

(63) Continuation-in-part of application No. 14/218,316, filed on Mar. 18, 2014, now abandoned.

(30) Foreign Application Priority Data

Jan. 24, 2013 (IL) .......................................... 224401

(51) Int. Cl.
*G06Q 30/02* (2012.01)
(52) U.S. Cl.
CPC ..... *G06Q 30/0273* (2013.01); *G06Q 30/0244* (2013.01); *G06Q 30/0276* (2013.01)
(58) Field of Classification Search
CPC .................................................... G06Q 30/02
See application file for complete search history.

(56) References Cited

U.S. PATENT DOCUMENTS 5,844,554 A * 12/1998 Geller ....................... G06F 8/38
715/744
5,870,719 A * 2/1999 Maritzen ................ G06Q 30/02
705/26.1

(Continued)

FOREIGN PATENT DOCUMENTS

KR 10-0602325 B1 * 7/2006 ............. G06Q 30/00
WO WO 2010/138412 A1 * 12/2010 ............. G06F 9/44
WO WO 2014/144498 A2 * 9/2014 ............. F16D 65/00

OTHER PUBLICATIONS

Tom Praison Rajadurai A, A method of creating and displaying dynamic advertisements based on structured information available on a web page, An IP.com Art Database Technical Disclosure, Apr. 26, 2012 (Year: 2012).*

(Continued)

*Primary Examiner* — Marilyn G Macasiano
(74) *Attorney, Agent, or Firm* — The Roy Gross Law Firm, LLC; Roy Gross

(57) ABSTRACT

A method of operating a computing system capable of allocating an advertisement budget of campaign between a plurality of advertisement entities, the method comprising: obtaining by the computer system, for each of the plurality of advertisement entities, a respective optimal target frontier function representing for each given advertising cost an optimal value of return and configured to follow the law of diminishing return; receiving by the computer system a budget constraint for the advertisement budget; generating, by the computer system, a global target frontier function by summing each of the received optimal target frontier functions; processing, by the computer system, the generated global target frontier function to determine for each of the plurality of advertisement entities an optimal, with respect of at least the received budget constrain, advertising cost value such that a sum of the optimal advertising cost values meets the budget constraint; and reporting the determined values.

8 Claims, 6 Drawing Sheets

(56) References Cited

U.S. PATENT DOCUMENTS

| | | | |
|---|---|---|---|
| 7,136,875 B2 | 11/2006 | Anderson et al. | |
| 7,478,329 B2 * | 1/2009 | Stevens | G06F 8/38 715/734 |
| 7,716,161 B2 | 5/2010 | Dean et al. | |
| 8,005,717 B2 | 8/2011 | Joo et al. | |
| 8,060,862 B2 * | 11/2011 | Eldridge | G06F 8/71 717/121 |
| 8,205,167 B2 | 6/2012 | Kang et al. | |
| 10,904,105 B2 * | 1/2021 | Venkiteswaran | H04L 63/10 |
| 2003/0014442 A1 | 1/2003 | Shiigi et al. | |
| 2004/0260767 A1 | 12/2004 | Kedem et al. | |
| 2007/0226613 A1 | 9/2007 | Tandriono et al. | |
| 2008/0082905 A1 | 4/2008 | Martinez et al. | |
| 2008/0178073 A1 | 7/2008 | Gao et al. | |
| 2008/0319850 A1 | 12/2008 | Shaul et al. | |
| 2009/0100154 A1 | 4/2009 | Stevenson et al. | |
| 2009/0249239 A1 | 10/2009 | Eilers | |
| 2009/0282349 A1 | 11/2009 | Olsen et al. | |
| 2010/0161674 A1 | 6/2010 | Winkler et al. | |
| 2011/0016409 A1 | 1/2011 | Grosz et al. | |
| 2012/0198374 A1 | 8/2012 | Zhang et al. | |
| 2014/0180798 A1 | 6/2014 | Bailey et al. | |
| 2015/0161277 A1 | 6/2015 | Heller et al. | |
| 2019/0266225 A1 * | 8/2019 | Solis | G06F 16/972 |
| 2019/0266227 A1 * | 8/2019 | Kirn | G06F 16/9574 |

OTHER PUBLICATIONS

M. Foley; A. Bose; W. Mitchell; A. Faustini, An object based graphical user interface for power systems (English), IEEE Transactions on Power Systems (vol. 8, Issude: 1, pp. 97-104), Feb. 1, 1993.*

M.C. Burton; J.B. Walther, A survey of web log data and their application in use-based design (English), Proceedings of the 34th Annual Hawaii International Conference on System Sciences (p. 10pp), Jan. 1, 2001 (Year: 2001).*

Ecma International, Standard ECMA-262: ECMAScript Language Specification, Edition 5.1 (Jun. 2011)—258 pages.

International Organization for Standardization, Standard ISO/IEC 16262:2011: ECMAScript language specification (4 pages).

Andrey Kovalev. "embAD". YouTube. YouTube, LLC. Jan. 14, 2013. Web: https://www.youtube.com/watch?v=BPb7m9cKk5U &feature=youtu.be.

Document Object Model. (Jan. 29, 2016). In Wikipedia, The Free Encyclopedia. Retrieved Mar. 1, 2016, from https://en.wikipedia.org/w/index.php?title=Document_Object_Model&oldid=702190580. 5 pages.

* cited by examiner

VISUAL DESIGNATION OF A ZONE IN RENDERED CODE

CROSS REFERENCE TO RELATED APPLICATIONS

This application is a continuation-in-part of U.S. patent application Ser. No. 14/218,316, filed on Mar. 18, 2014, which claims priority from Israeli Patent Application No. 224401, filed on Jan. 24, 2013, entitled "VISUAL DESIGNATION OF A ZONE IN RENDERED CODE". The contents of the above applications are all incorporated by reference as if fully set forth herein in their entirety.

FIELD OF THE INVENTION

The invention relates to visual designation of elements in rendered code.

BACKGROUND

Advertising using traditional media, such as television, radio, newspapers and magazines, is well known. Unfortunately, even when armed with demographic studies and entirely reasonable assumptions about the typical audience of various media outlets, advertisers recognize that much of their advertising budget is oftentimes simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their advertisements (also "ads") to a receptive audience. That is, targeted ads are more likely to be useful to end users since the ads may be relevant to a need inferred from some user activity (e.g., relevant to a user's search query to a search engine, relevant to content in a document requested by the user, etc.). Query keyword targeting has been used by search engines to deliver relevant ads. For example, the AdWords advertising system by Google Inc. of Mountain View, Calif., delivers ads targeted to keywords from search queries. Similarly, content targeted ad delivery systems have been proposed. For example, U.S. Pat. No. 7,716,161 to Dean et al. and U.S. Pat. No. 7,136,875 to Anderson et al. describe methods and apparatuses for serving ads relevant to the content of a document, such as a web page. Content-targeted ad delivery systems, such as the AdSense advertising system by Google for example, have been used to serve ads on web pages.

AdSense is part of what is often called advertisement syndication, which allows advertisers to extend their marketing reach by distributing advertisements to additional partners. For example, third party online publishers can place an advertiser's text or image advertisements on web pages that have content related to the advertisement. This is often referred to as "contextual advertising". As the users are likely interested in the particular content on the publisher web page, they are also likely to be interested in the product or service featured in the advertisement. Accordingly, such targeted advertisement placement can help drive online customers to the advertiser's website.

Optimal ad placement has become a critical competitive advantage in the Internet advertising business. Consumers are spending an ever-increasing amount of time online, looking for information. The information, provided by Internet content providers, is viewed on a page-by-page basis. Each page can contain written and graphical information as well as one or more ads. Key advantages of the Internet, relative to other information media, are that each page can be customized to fit a customer profile and ads can contain links to other Internet pages. Thus, ads can be directly targeted at different customer segments. For example, ad targeting is nowadays possible based on the geographic location of the advertiser and/or the customer, the past navigation path of the customer outside or within the web site, the language used by the visitor's web browser, the purchase history on a website, the behavioral intent influenced by the user's action on the site, and more.

Furthermore, the ads themselves are often designed and positioned to form direct connections to well-designed Internet pages. The concept referred to as "native advertising" offers ads which more naturally blend into a page's design, in cases where advertiser's intent is to make the paid advertising feel less intrusive and, therefore, increase the likelihood users will click on it.

As with traditional, offline advertising, Internet advertising is also not free from problems which cause big chunks of the advertising budget to go to waste. In the online world, this has commonly been attributed, at least partially, to a phenomena called "advertisement blindness" or "banner blindness", in which web site visitors, consciously or subconsciously, simply ignore the displayed web advertisements. Efforts have been made to fight that blindness, by developing more appealing advertisements, improving the location of the advertisements in the page, etc. However, it is still considered very difficult to identify and eliminate such waste.

U.S. Patent Application Publication No. 2004/0260767 to Kedem et al. discloses a web page advertisements playing system for use over the Internet, which has a server to activate java script programs, where one program analyzes technical browsing limitations and web-page structure for creating instruction sets to play ad. On the advertisement server's side, the ad composer determines the campaign type and scenario and assigns the respective ad content source location. The ad composer's operation instruction sets and relevant information of ad content are transferred to the user's device browser including a calling instruction for activating the main java script. At the next step, the browser calls the main java script program, which is active during the browsing session of the specific web-page and controls the presentation of the campaign advertisement. The parameters of the instructions for controlling the ad presentation can include all physical properties, attributes and display techniques of an object, including and not limited to size, shape, geographic screen location (upper, lower, upper-left, lower-right, right, left), etc.

U.S. Pat. No. 8,205,167 to Kang et al. discloses an advertisement window processing module which displays the advertisement window for displaying the advertisement in a certain area (the left, right, top or bottom) of the Web browser and/or the file explorer. The advertisement window processing module requests advertisement control data by transmitting the user code to the advertisement control server and then displays the advertisement according to the advertisement control data received from the advertisement control server in response to the request. The advertisement control data may include an advertisement URL address in which the advertisement HTML data of the advertiser are stored, the location and the size of the advertisement window, and an advertisement display period. The advertisement window processing module stores the advertisement control data in the local storage, accesses the advertisement server at the URL address included in the control data, fetches the corresponding advertisement data from the advertisement server, and then displays the advertisement in the advertisement window according to the location and size specified in the control data.

U.S. Pat. No. 8,005,717 to Joo discloses an internet advertising system including terminals connected to a Web server through the Internet to relay communication of clients. The advertising system includes a location search module for searching a Web page to be displayed on the terminals for the location into which new advertising content is to be inserted, an identification module for identifying the size and coordinates of a corresponding location found by the location search module, an advertising content database (DB) for storing new advertising content and an editing module for analyzing the size and coordinates of the location obtained by the identification module, searching the advertising content DB for new advertising content corresponding to the analyzed location size and coordinates, and inserting the found new advertising content into the Web page to be displayed.

U.S. Patent Application Publication No. 2008/0319850 to Shaul et al. discloses a method for managing website advertising space. Prior to selecting a desired advertisement to be displayed, the host site administrator defines one or more advertising spaces of the host site, in which an advertisement is to be displayed, including their characteristics, such as demographic, geographic and psychographic characteristics of typical users that interact with the host site, the nature of information displayed on the host site, the relative location within a web page at which the advertisement is to be displayed, and the size of the advertising space. The host site administrator receives from the service provider a unique executable code, which is interfaceable with the service provider server, for each advertising space that is defined, e.g. a Common Gateway Interface (CGI) program, and embeds each of the unique executable codes within the source code of a HyperText Markup Language (HTML) page of the host site. Each embedded executable code, when initiated, is able to transmit data which identifies a given advertising space to the service provider server.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for visually designating advertising space in a web page, the method comprising using at least one hardware processor for: retrieving a Document Object Model (DOM) of a web page displayed in a web browser; detecting a user selection, made using an input device, of a graphical object in a graphical view of the displayed web page; translating the graphical object in the graphical view to a DOM object in the DOM; updating the DOM with an advertisement placeholder associated with the DOM object, and causing the web browser to display the web page with the advertisement placeholder; and composing instructions for a first client-side script for injecting an advertisement associated with the DOM object upon a visitor visiting the web page.

There is further provided, in accordance with an embodiment, a method for visually designating advertising space in a web page, the method comprising using at least one hardware processor for: retrieving a Document Object Model (DOM) of a web page displayed in a web browser; detecting a signature in a source code of the web page, the signature being indicative of a type of a web site to which the web page belongs; based on the type of web site, displaying one or more options for an advertising positioning layout, and receiving from the user a selection of one of said one or more options; translating the selected one of said one or more options to one or more advertising positions in the DOM; and updating the DOM, based on the selected one of said one or more options, with at least one advertisement placeholder, and causing the web browser to display the web page with the at least one advertisement placeholder.

There is also provided, in an embodiment, a method of operating a computing system capable of allocating an advertisement budget of an advertisement campaign between a plurality of advertisement entities, the method comprising: obtaining by the computer system, for each of the plurality of advertisement entities, a respective optimal target frontier function representing for each given advertising cost an optimal value of return and configured to follow the law of diminishing return; receiving by the computer system a budget constraint for the advertisement budget; generating, by the computer system, a global target frontier function by summing each of the received optimal target frontier functions; processing, by the computer system, the generated global target frontier function to determine for each of the plurality of advertisement entities an optimal, with respect of at least the received budget constrain, advertising cost value such that a sum of the optimal advertising cost values meets the budget constraint; and reporting the determined values.

In some embodiments, said retrieving is from the web browser.

In some embodiments, said retrieving, said detecting, said translating and said updating are performed by executing, in the web browser, a second client-side script.

In some embodiments, said retrieving, said detecting, said translating and said updating are performed by executing, in the web browser, the first client-side script.

In some embodiments, said first client-side script is written in JavaScript.

In some embodiments, said executing of the second client-side script comprises retrieving the second client-side script from a bookmarklet.

In some embodiments, said executing of the first client-side script comprises retrieving the first client-side script from a bookmarklet.

In some embodiments, said executing of the second client-side script comprises retrieving the second client-side script from a remote server linked to by a bookmarklet.

In some embodiments, said executing of the first client-side script comprises retrieving the first client-side script from a remote server linked to by a bookmarklet.

In some embodiments, said executing of the second client-side script comprises operating an add-on of the web browser, the add-on comprising the second client-side script.

In some embodiments, said executing of the first client-side script comprises operating an add-on of the web browser, the add-on comprising the first client-side script.

In some embodiments, said executing of the second client-side script comprises operating an add-on of the web browser, to retrieve the second client-side script from a remote server linked to by the add-on.

In some embodiments, said executing of the first client-side script comprises operating an add-on of the web browser, to retrieve the first client-side script from a remote server linked to by the add-on.

In some embodiments, the second client-side script is embedded in the web page, and comprises instructions for triggering said executing responsive to a determination of the user being an administrator of the web page.

In some embodiments, the first client-side script is embedded in the web page, and comprises instructions for triggering said executing responsive to a determination of the user being an administrator of the web page.

In some embodiments, a command to call the second client-side script from a remote server is embedded in the web page.

In some embodiments, a command to call the first client-side script from a remote server is embedded in the web page, and wherein the first client-side script comprises instructions for triggering said executing responsive to a determination of the user being an administrator of the web page.

In some embodiments, said determination comprises identifying an administrator cookie stored in a cookie depository of the web browser.

In some embodiments, said determination comprises identifying a Uniform Resource Locator (URL) parameter entered by the administrator in an address bar of the web browser.

In some embodiments, the method further comprises guiding the user to perform the selection by providing the advertisement placeholder to be dragged and dropped onto the location in the graphical view of the displayed web page; and updating the DOM and the graphical view of the displayed web page on the fly, to display the advertisement placeholder in the location.

In some embodiments, the method further comprises receiving from the user one or more parameters pertaining to the advertisement, said one or more parameters selected from the group consisting of: an advertisement size, an advertisement style, an advertising content, indication of which pages of a web site the advertisement is to be displayed in and an advertisement position relative to an element of the DOM.

In some embodiments, the method further comprises displaying an advertisement parameter interface for enabling the user to define the one or more parameters pertaining to the advertisement.

In some embodiments, the advertisement parameter interface is displayed adjacent the selected location.

In some embodiments, the method further comprises transmitting the first client-side script to a remote server, and providing the user with a code snippet for embedding in the web page, wherein the code snippet comprises a call to the first client-side script from the remote server.

In some embodiments, the method further comprises transmitting the first client-side script to a remote server, wherein the first client-side script comprises a call to the second client-side script from the remote server.

In some embodiments, the instructions for injecting the advertisement associated with the DOM object are configured to cause the advertisement to be displayed in a location adjacent to the graphical object upon visitor interaction with the graphical object.

In some embodiments, the instructions for injecting the advertisement associated with the DOM object are configured to cause the advertisement to be displayed in a fixed location relative to the graphical view of the displayed web page, upon visitor interaction with the graphical object.

In some embodiments, the advertisement associated with the DOM object is an advertisement inside the DOM object, and wherein the instructions for injecting the advertisement are configured to invoke a display of the advertisement upon a visitor viewing the web page.

In some embodiments, the method further comprises composing instructions for a first client-side script for injecting an advertisement in each of the at least one advertising position.

In some embodiments, the type of the web site further comprises a template structure used in the CMS.

In some embodiments, the type of the web site comprises a type of a web site plugin used for the web site.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Glossary

Figure 1:
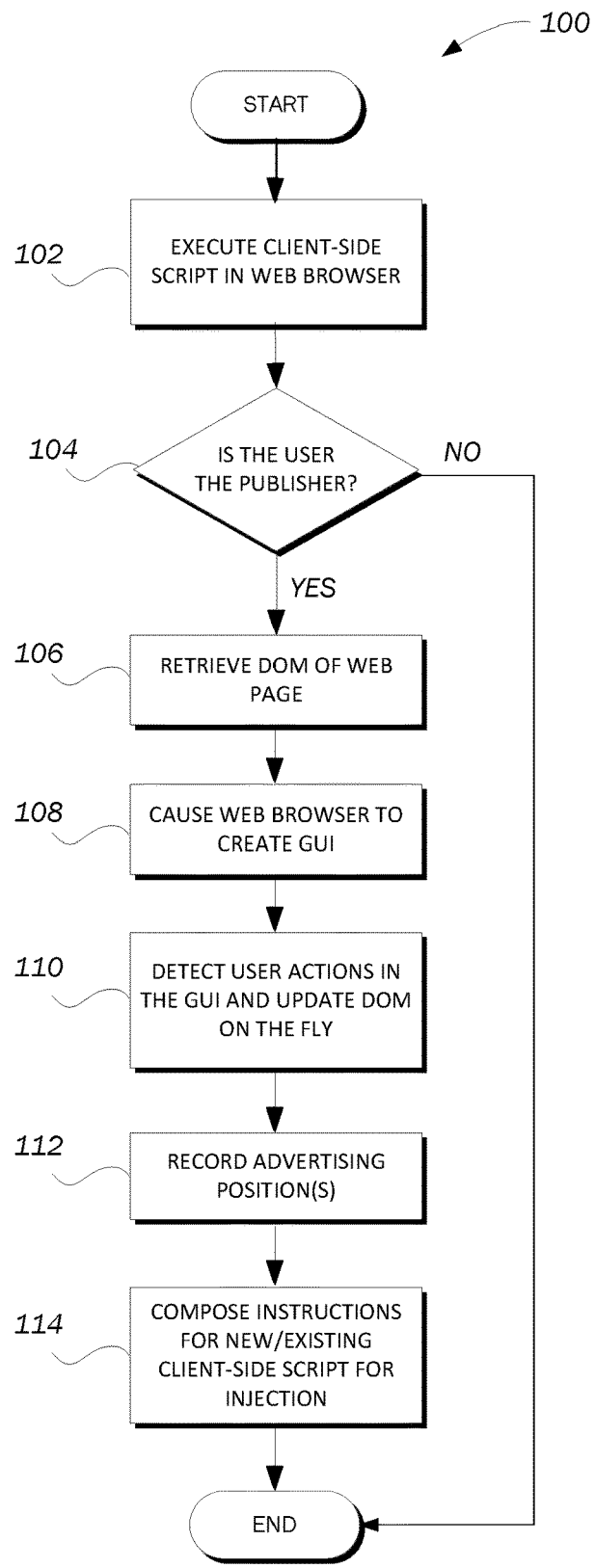
FIG. 1 shows a flow chart of a computer-based method for visually designating advertising space in a web page.
Figure 2A:
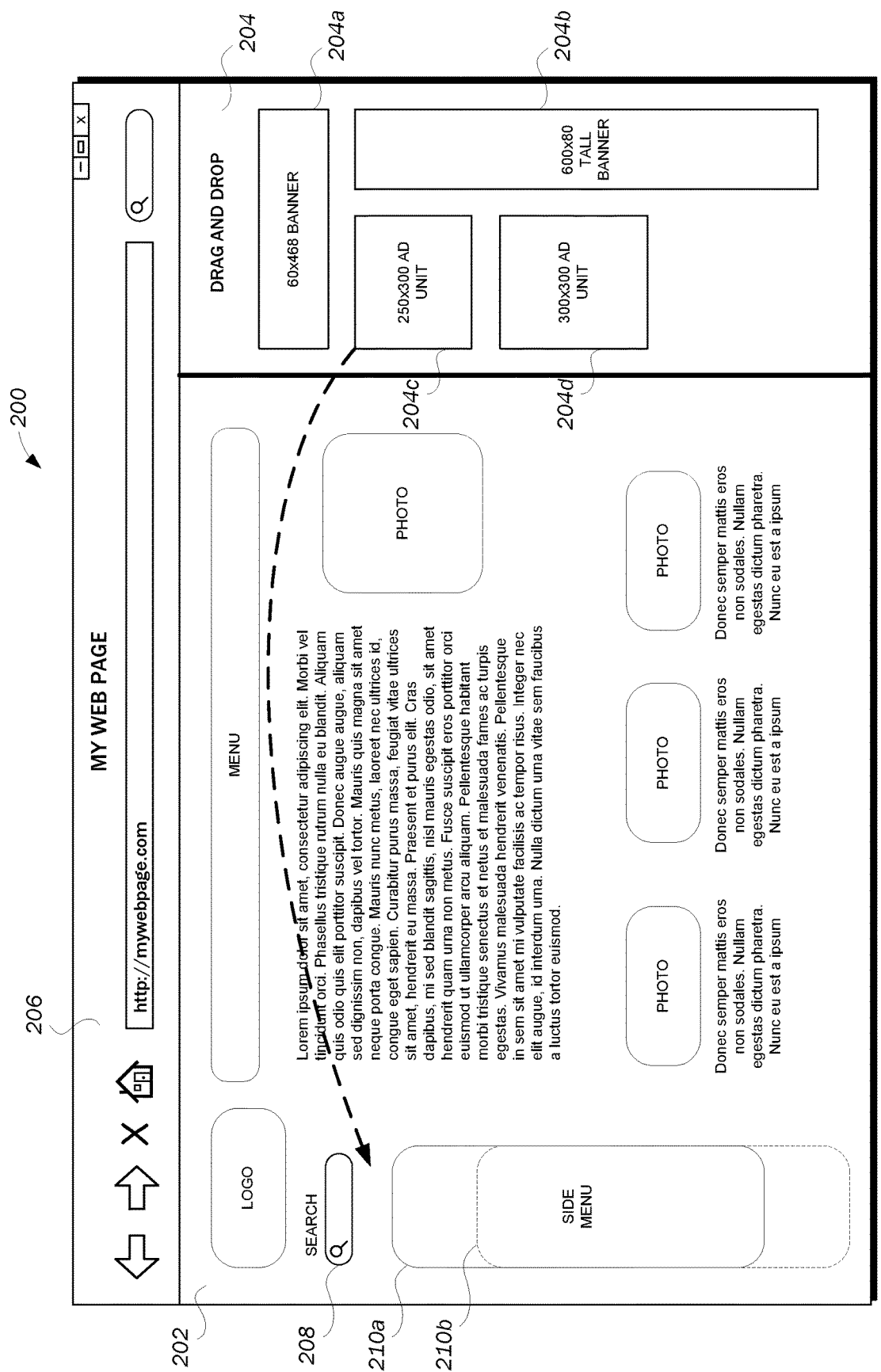
FIGS. 2A, 2B, 2C, 2D and 2E each shows an exemplary GUI for visually designating advertising space in a web page.
Figure 2B:
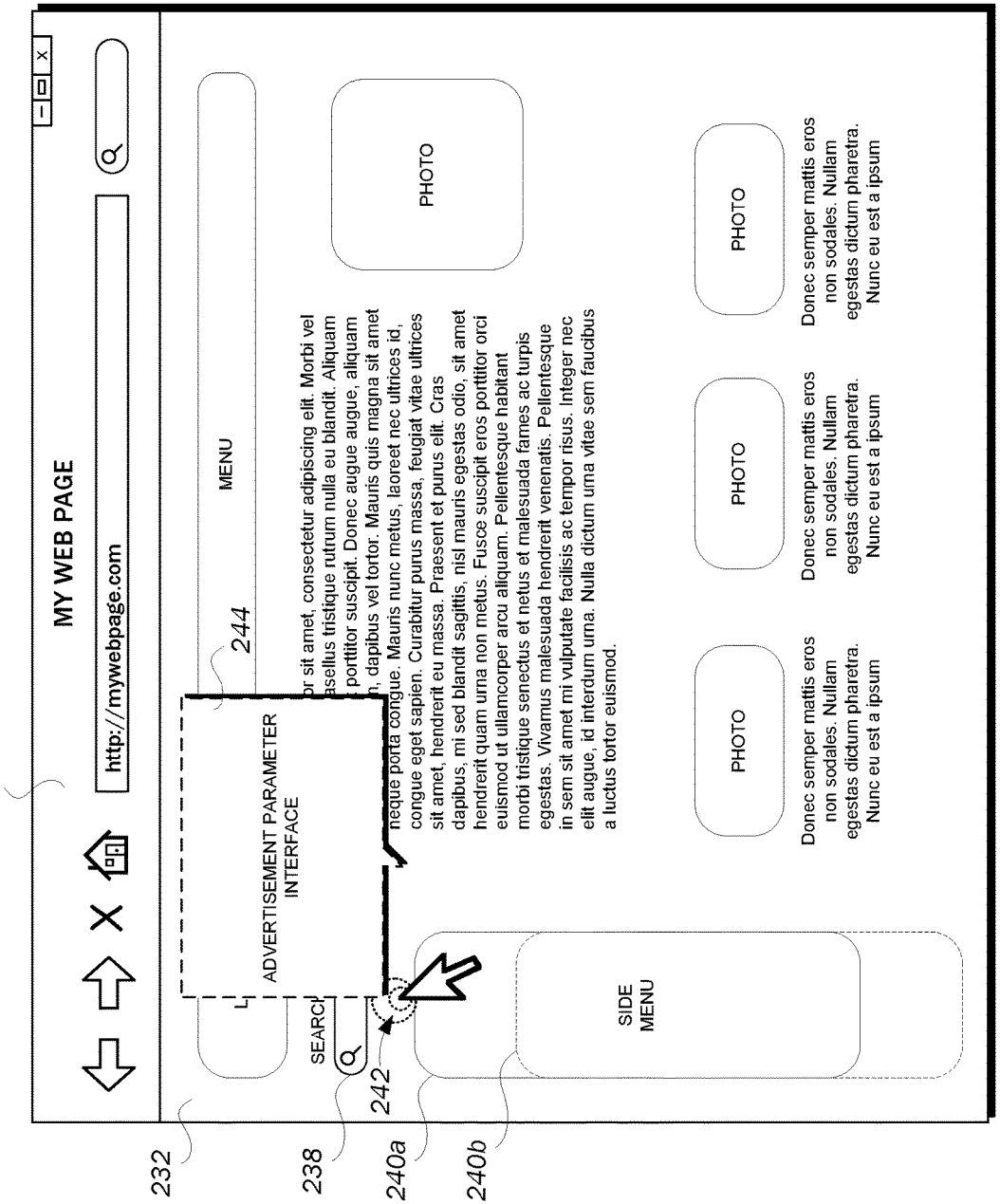
Figure 2C:
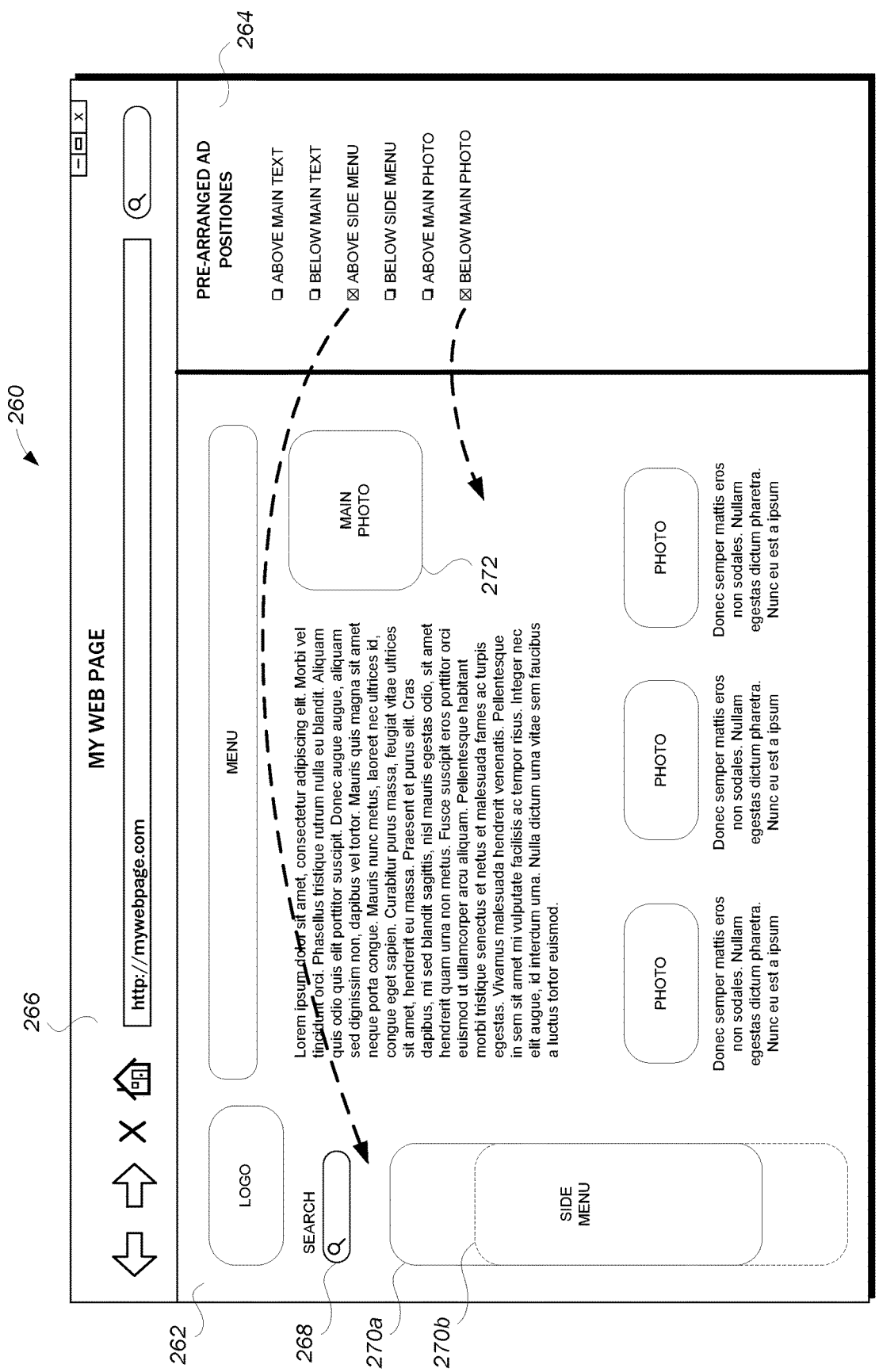
Figure 2D:
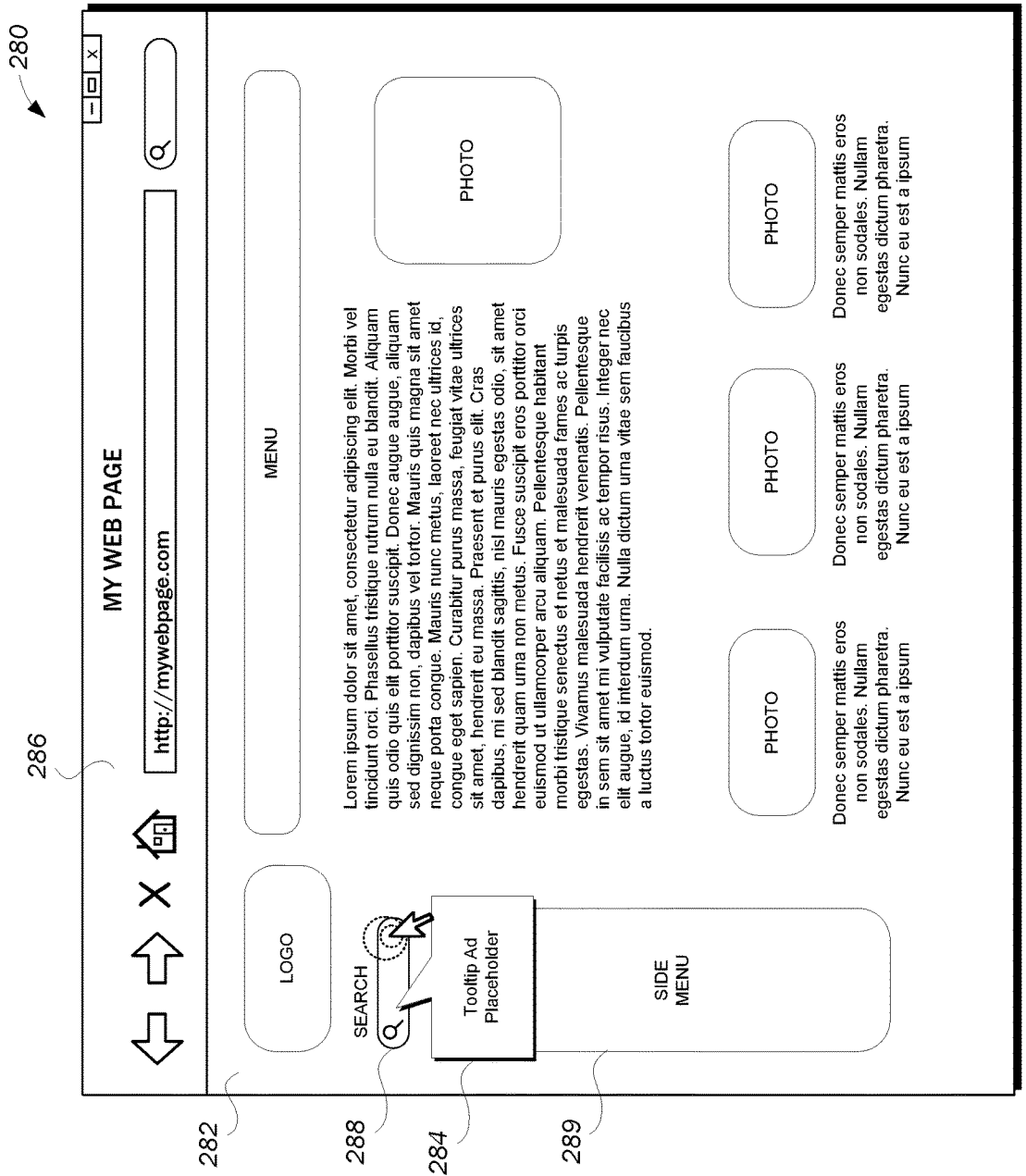
Figure 2E:
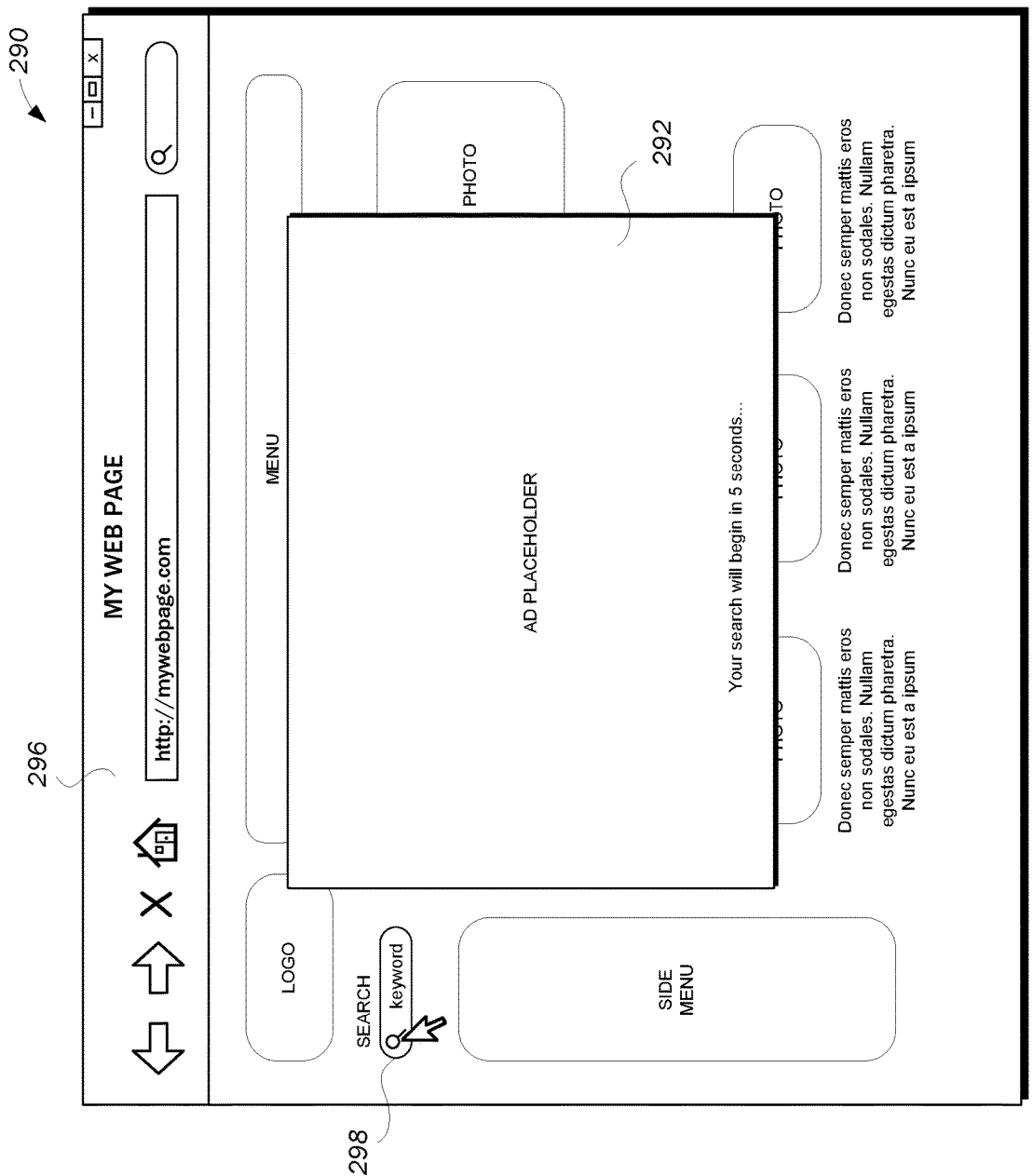

As referred to herein, the term "web page" may refer to a document whose source code is typically written in plain text interspersed with formatting instructions of Hypertext Markup Language (HTML, XHTML) and optionally Cascade Style Sheets (CSS), which web page contains content such as text, images, video, audio, hyperlinks, etc.

As referred to herein, the term "web site" may refer to a set of related web pages. A web site is hosted on at least one web server, accessible via a network, such as the Internet or a private local area network, through an Internet address known as a Uniform Resource Locator (URL). Web pages of a web site are usually requested and served from a web server using Hypertext Transfer Protocol (HTTP). All publicly accessible websites collectively constitute what is referred to as the World Wide Web. A "static" web site is one that has web pages stored on the server in the same format that is sent to a client web browser. In a "dynamic" web site, on the other hand, the code of the web pages is constructed dynamically, on the fly, using active programming language instead of plain, static HTML. Content management systems (CMSs) are software products used for creating and managing dynamic websites. Common CMSs today include Joomla, Drupal, WordPress, DotNetNuke, Django, phpWiki and others.

As referred to herein, the term "graphical view of a web page" may refer to a graphic, rendered representation of a web site's source code. The source code is typically interpreted, rendered and presented by a web browser. The graphical view of the web page commonly shows the text, images, video, audio, hyperlinks and/or any other elements of the web page.

As referred to herein, the term "web browser" may refer to a software application for retrieving, interpreting, rendering and presenting information resources from the World Wide Web or local servers. A web browser enables users to access and view documents and other resources on the Internet. Some of the major web browsers today are Google Chrome, Mozilla Firefox, Microsoft Internet Explorer, Opera, and Apple Safari.

As referred to herein, the term "JavaScript" may refer to the scripting language commonly implemented as part of web browsers in order to create enhanced user interfaces and/or dynamic websites. JavaScript was formalized in the ECMAScript language standard and is primarily used in the form of client-side JavaScript, namely—as part of a web browser. See Ecma International, Standard ECMA-262: ECMAScript Language Specification, Edition 5.1 (June 2011), available at http://www.ecma-international.org/publications/standards/Ecma-262.htm; and International Organization for Standardization, Standard ISO/IEC 16262:2011: ECMAScript language specification, available at http://www.iso.org/iso/iso_catalogue/catalogue_tc/catalogue_detail.htm?csnumber=55755. These two standards are incorporated herein by reference in their entirety.

As referred to herein, the term "web site plugin" may refer to a server-side or client-side script component that adds specific abilities to an existing web site or web page. Examples include a Facebook comment box, a social bookmarking button, an automatically-created gallery, a forum engine, a Lightbox-style plugin and/or the like. Lightbox is an unobtrusive script developed by Lokesh Dhakar, used to overlay images on a web page A computer-based method for visual designation of placeholders (also "zones") in rendered code is disclosed herein. The method may be used, for example, for visually designating advertising space in a web page. The method may also be used to designate a graphical element in a web page to trigger a hidden advertisement upon user interaction with the graphical element, causing the advertisement to be revealed. Advantageously, the method enables a web page administrator (also referred to as a "publisher") who wishes to monetize his or her web page, to designate one or more advertising positions and/or graphical elements (also "objects") to trigger an advertisement in the web page by using a user-friendly GUI (graphic user interface). This GUI reduces to a minimum, or even eliminates, the need of the administrator to manually access the source code of the web page in order to implant code snippets in it.

In some embodiments, the present disclosure further provides for a method for allocation of an advertisement budget of an advertisement campaign between a plurality of advertisement entities. The method comprises receiving for each of the plurality of advertisement entities a corresponding optimal value of its target frontier function respective of an advertising cost; receiving at least a budget constraint for the advertisement budget; creating a global target frontier function that is a sum of each of the target frontier functions of each of the plurality of advertisement entities, each of the target frontier function is multiplied by a binary inclusion variable; optimizing the global target frontier function to determine a marginal equilibrium, wherein determination of the marginal equilibrium results in an advertising cost value for each of the plurality of advertisement entities and a value of the binary inclusion variable for each of the target frontier functions, wherein a sum of the advertising cost values determined for each of the plurality of advertisement entities meets the budget constraint; and reporting the determined values.

As a result of the present method, computing resources at the server side, as well as network bandwidth between the server and the client (of a web page visitor) may be saved. That is, the source code of the web page need not contain, when stored on the server, a separate code snippet in each location an ad is desired. Instead, the source code of the web page includes only a single, relatively short code snippet, which is used, at the client side, for injecting ads into desired locations on the fly. This injecting utilizes the computing resources, such as CPU, of the client computer.

As another example, the method may be used to visually designate space for virtually any content element, such as an image, a video, text and/or the like—not necessarily advertising-related. The webmaster may even be able to define custom HTML code and/or scripting code to be placed in each designated advertisement placeholder.

An advertisement may include, for example, a rectangular banner or a banner having any other shape, containing information such as text, image(s), video(s) or any combination thereof. In addition, an advertisement may be what is often referred to as an "interstitial ad" displayed before/after the visitor is shown a specific web page or before/after a specific user-triggered action (such as a file download, navigating away from a web page, submitting a form, etc.) is completed. The advertisement may either be overlaid on the web page the user is currently viewing, and/or on the page the user has been transferred to.

To create an interstitial placement, according to some embodiments, the administrator may select the DOM element that will trigger the interstitial ad by clicking on the element in the graphical view of the web page. Such element may be, for example, a hyperlink (e.g. one that leads to another page or link to a downloadable file), a button, an image, a video, a form element and/or other element visible to the user. Once the selection of the element is made, an advertisement placeholder optionally appears as an overlay element (often called "DIV overlay" or "Modal Dialog") on the page, by altering the existing page's DOM. The user may then choose one or more parameters relating to the placement visualization (e.g. size, color, position) and functionality (e.g., add a "skip" button/link to the placement and/or set a timer countdown after which the user requested action will be completed) and/or parameters relating to the triggering of the placement (e.g. the trigger event such as click or mouse-over, delay between the triggering event and the actual appearance of the ad). The triggering element information and the placement parameters are saved and converted to an instructions client-side script that will be injected to the page and later executed to create the placement upon visitor triggering. The instructions may also be a set of parameters which will later be interpreted by a script already embedded in the web page, to inject the advertisement to the page, with or without visitor triggering.

For reasons of simplicity, the following discussions refer to "advertisements" as the elements to be positioned in the placeholders. However, it is intended that the term "advertisement" and any variations thereof be representative of any other content element, as discussed above, which may be placed in a visually-designated placeholder.

According to some embodiments, the GUI is executed and displayed within the framework of a web browser, utilizing code written in a client-side scripting language such as JavaScript and/or the like. The code for executing the GUI may be provided in one or a number of ways, such as:

- the code may be embedded in the source code of the web page;
- the code may be stored locally, on the client computer, as a bookmarklet (code stored in the URL parameter [HREF] of a hyperlink, often implemented as a bookmark containing JavaScript code) of the web browser; and
- the code may be stored locally, on the client computer, as part of a browser add-on (also referred to as an "extension" or a "plug-in").

As an alternative to these three options, the code may be stored on a remote server, and a call to this remotely-stored code may be included in the source code of the web page, the bookmarklet or the browser add-on, respectively.

The GUI created by the code may assume, for example, one or more of the following shapes:

- a "drag-and-drop" interface, in which the user is provided with one or more dummy advertisements (also referred to as "advertisement placeholders"), such as rectangular banners and/or the like, which he or she may drag, using a pointing device such as a mouse, to a desired location in the graphic view of the web page; and
- an interface wherein the user may click, using the pointing device, on a desired location for an advertisement. Responsive to this click, an interface, such as a window overlaid on the graphic view of the web page, may be displayed, which interface includes a form enabling manual entry of one or more advertisement parameters. These may include, for example, an advertisement size, an advertisement style, an advertisement position relative to an element of the DOM, and/or an event to invoke advertisement display. Alternatively, the interface may already be visible prior to clicking on the desired location, and be populated with default parameters which are changeable by the user after performing the click on the desired advertisement location. Upon clicking on the desired location, an advertisement placeholder may appear in close proximity to the location. The advertisement placeholder reflects, automatically and immediately, any changes the user makes to the advertising parameters.
- an interface wherein the user may click, using the pointing device, on a desired trigger for an advertisement. The term "trigger" refers to a DOM object (or "element") which is intended to trigger an advertisement to appear in a different location, responsive to a visitor acting upon the trigger. For example, the trigger may be a text field, which, upon the visitor making it in focus (clicking on it, starting to type in it, etc.), may cause an advertisement in form of a tooltip or a Modal Dialog to appear nearby. Referring now back to the designation of the trigger, responsive to the user's click on the desired trigger, an interface, such as a window overlaid on the graphic view of the web page, may be displayed, which interface includes a form enabling manual entry of one or more advertisement parameters. These may include, for example, an advertisement size, an advertisement style, an advertisement position relative to an element of the DOM, and/or an event to invoke advertisement display. Alternatively, the interface may already be visible prior to clicking on the desired DOM element, and be populated with default parameters which are changeable by the user after performing the click on the desired DOM element.
- an interface allowing the user to select a pre-arranged advertisement layout out of multiple possibilities based on the web site type or web site plugins currently embedded in the site. This type of interface may be suitable, for example, for dynamic web sites, such as those based upon a CMS.

While designating the ad placement in the GUI, the user may decide in which pages of the web site the ad placement should be injected (aside for the current page loaded), in order to save time and create one placement that fits many pages (without creating one for each page separately) or to exclude certain pages (like a specific section, category and/or subdomain) from showing the ad placement. Specifying what pages to include or exclude can may done in multiple ways, such as:

- Searching for an exact text pattern in the URL (egg, all pages that begin/contain/end with "news", such page can be http://www.exmaple.com/news/page1.html). URLs that "begin" with certain text, are checked when using the domain as a base/predefined URL.
- Using negative matching (all the URLs which do not begin/contain/end with "news").
- Providing multiple matching condition, such as AND/OR conditions, to create a set of requirements for URL matching, whether positive or negative. Another option is using regular expressions in order to match URL patterns.
- The user may state that the ad should be loaded for every URL in the site, whenever possible, or just for the current page.
- It is also possible to limit the loading of the ad according to certain text/code that is found within the page. For example, only load an ad placement on pages where the text "copyright" exists or where the tag <td id="blabla"> exists.

Following the designation of the one or more advertising positions in the web page by the publisher, information on the designation may be transmitted to a remote server which processes the information and composes a client-side script, optionally also in JavaScript. This client-side script may then be used for invoking one or more advertisements in the one or more advertising positions, respectively, when a visitor visits the web page. This client-side script optionally remains stored in the remote server, and is called by the GUI code already embedded in the source code of the web page. Alternatively, the client-side script is provided to the publisher as a code snippet, and the publisher may manually embed it in the source code of the web page. Albeit manual embedding of code is needed in this scenario, it still offers enhanced convenience to the publisher, since a single code snippet is able to invoke multiple advertisements in multiple positions in the web page, and there is no need to manually implant a separate code snippet in every location where an advertisement is desired. The information on the designation may be transmitted to a remote server which processes the information and composes a set of parameters which represent different aspects of the advertisement. These parameters may be called by a code already installed in the source code of the page and be processed by the code that is designed to interpreting the parameters and inject an advertisement to the page with the given parameters.

Reference is now made to FIG. 1, which shows a flow chart of a computer-based method 100 for visually designating advertising space in a web page. Method 100 relates, merely for reasons of simplicity, to a single web page. However, method 100 may be employed, in a similar manner which will be apparent to those of skill in the art, on a whole website. For example, method 100 may be used for designating advertising space in a dynamic website, by defining where advertisement are to be displayed in different types of web pages created dynamically by the website.

In a step 102, a client-side script (or "script" for short), written, for example, in the JavaScript language, is executed within a web browser running on a client computer of the publisher. The script is executed when a user of the client computer utilizes the web browser for accessing a web page.

The script may be provided to the web browser, for example:
- by a previous embedding of the script in the source code of the web page;
- by retrieving the script from a bookmarklet, whether in the form of a hyperlink appearing in a web page or stored in local storage, on the client computer; and/or
- by retrieving the script from a local storage, on the client computer, as part of a web browser add-on.

As an alternative to these three options, as discussed, the script may be stored on a remote server accessible through the Internet, and a call to this remotely-stored script may be included in the source code of the web page, the bookmarklet or the add-on, respectively. As one illustrative example, the source code of the web page may include a command for the web browser to load a remotely-stored script, by reference to the URL of the script.

The script includes instructions to the web browser on how to create and operate the GUI discussed above. However, before the script creates the GUI and makes it usable to the user, an optional step 104 may take place.

In optional step 104, instructions in the script determine whether the user who is presently visiting the web page is the publisher or a casual visitor. If the user is a casual visitor, method 100 terminates. If, however, the user is determined to be the publisher, method 100 continues. The determination may be performed, for example, by:
- an instruction in the script to identify a specific cookie (also referred to as an "administrator cookie") stored in a cookie depository of the web browser. This cookie was previously stored in the depository upon manual authentication of the publisher's identity. If the cookie is not present, the user is optionally requested to manually authenticate, such as by entering a username and a password;
- based on a certain IP address, which can be retrieved if the publisher has a static IP or if the IP of the publisher is recognized in an earlier step;
- based on recognizing a URL parameter entered by the publisher as part of the present page's URL and only known to him or her—serving as a type of a password;
- checking for a certain HTTP referrer (such of that of a parent window, frame or a previous web page or web site);
- checking a combination of a browser-provided variable which creates a "digital fingerprint" if combined (for example, resolution+OS+browser version+color-depth+etc. . . . ).

In a step 106, the script retrieved a Document Object Model (DOM) of the web page from the web browser. The web browser accesses the source code of the web page, which is typically written in HTML, and analyzes the tag structure in the source code to establish the DOM of the web page. The retrieval of and access to the DOM of the web page, in some embodiments, is what makes it possible to later inject advertisements in different locations in the DOM, and consequently in the web page. Access to and interaction with the DOM is possible, for example, using JavaScript, JQuery, Xpath, CSS selectors, MOXy, JAXB, The Simple XML serialization and configuration framework, Apache Digester, etc.

In a step 108, the script causes the web browser to create the GUI.

Interim reference is now made to FIGS. 2A, 2B, 2C, 2D and 2E, which show five exemplary GUIs, 200, 230, 260, 280 and 290, respectively. GUI 200 demonstrates a "drag-and-drop" mode of operation, in which both a web page 202 and a gallery 204 of advertisement placeholders 204*a-d* are displayed in a web browser 206. Gallery 204 is created by the script. The user may, using a pointing device of the computer, a touch screen or the like, drag an advertisement placeholder, such as placeholder 204*c*, to a desired position in web page 202, such as between a search box 208 and a side menu 210*a*. The script then updates the DOM of web page 202 on the fly, and pushes side menu 210*a* to a new location 210*b* to clear space of placeholder 204*c*.

GUI 230 is a demonstration of an interface wherein the user may click, using the pointing device, on a desired location for an advertisement. GUI 230 shows a web page 232 inside a web browser 236. Upon the user clicking on a desired location, such as location 242, a window (hereinafter an "advertisement parameter interface") 244 overlaid on the graphic view of the web page, may be displayed. Advertisement parameter interface 244 may display a form of and allow the user choose from one or more parameters, such as: an advertisement size, an advertisement style, an advertisement position relative to an element of the DOM, an event to invoke advertisement display, etc. Once the user finishes entering the parameters, optionally, an advertisement placeholder (not shown) may be displayed in location 242, having the look according to one or more of the parameters entered. To this end, one or more objects of the DOM of web page 232, such as a side menu 240*a*, may be pushed to a different location 240*b* to clear space for the advertisement placeholder.

GUI 260 is a demonstration of an interface wherein the user may select one or more pre-arranged advertisement layouts, and the script automatically displays advertisement placeholders according to the layout. GUI 260 is suitable, for example, for dynamic web sites, such as those based upon a CMS. To this end, the script may include instructions for attempting to recognize whether a web page 262 is part of a certain CMS, and for identifying the CMS. This may be performed, during the analysis of the web pages source code, by searching for "signatures" of known CMSs, in the form of text strings identifying the CMS or known to be associated with a specific CMS.

Knowledge about the identity of the pertinent CMS enables the present method to tailor certain pre-arranged advertisement positions to the CMS. For example, in the WordPress CMS, which is mainly aimed at blogs, the pre-arranged advertisement positions may be tailored to certain positions in dynamic page types of WordPress such as "posts" and "pages". Each such dynamic page type is typically created by a server-side script which dictates the page's structure. The present method may therefore analyze the DOM resultant from such server-side script, and produce a client-side script capable of injecting advertisements into specified positions in the dynamic page.

GUI 260 may also be suitable for web sites which incorporate popular visual components and/or web site plugins that are built with JavaScript, server side scripts and/or the like. Examples include a Facebook comment box, social bookmarking buttons, an automatically-created gallery, a forum engine, a Lightbox-style plugin and/or the like.

These components add specific functionalities to supplement the web page and can be usually added regardless of a website's CMS, and even to static web pages. Each of these components usually leaves a unique "signature" in the web page code, such as text stings and/or unique HTML tags/attributes. When analyzing a web page's source code, signatures of these components may be easily identified, and thus, injecting an ad placement tailored to each of these components' unique functionality and layout is possible without requiring the publisher to manually try to figure out how to place an ad in or based to the component or the interaction of a visitor with a component.

Back to the figure, GUI 260 shows web page 262 inside a web browser 266. Alongside web page 262, a menu 264 of pre-arranged ad positions is displayed using the script of step 102 (FIG. 1). For example, if the user selects the option "above side menu", an advertisement placeholder (not shown) may be displayed between a search box 268 and a side menu 270a, pushing the side menu to a new location 270b further down. Similarly, if the user selects "below main photo", an advertisement placeholder (not shown) may be displayed below a main photo 272.

GUI 280 shows a web page 282 inside a web browser 286. In this GUI, a search box 288 is defined as a trigger for displaying an ad in a different place, such as a tooltip ad 284 displayed adjacent to the trigger. Tooltip ad 284, or any other type of triggered by a certain defined trigger, may be superimposed on (or "overlying") other elements of the web page, such as a side menu 289, and does not cause existing DOM elements to rearrange to make space for the advertisement.

Finally, GUI 290 shows a web page 292 inside a web browser 296. In this GUI, clicking on a search button 298 or otherwise submitting the search, triggers an interstitial ad 292 which is superimposed on the web page. Similarly, any elements on web page 292 may serve as a trigger for displaying an interstitial ad, such as ad 292.

Reference is made back to FIG. 1. In a step 110, the web browser, based on instructions in the script, detects the user actions in the GUI, such as the user's selection of one or more locations in a graphical view of the displayed web page, where one or more ads, respectively, are to be displayed, or a selection of a trigger for an ad. The detection may include detecting physical user input, such as mouse clicks, keyboard strokes and/or the like. Optionally, in this step, the web browser, based on instruction in the script, updates the DOM on the fly, and renders the web page in real time, to display the web page with the latest user selection(s) and may also display an advertising placeholder associated with the selection.

Then, in a step 112, the web browser, based on instruction in the script, designates and records one or more advertising positions in the DOM, based on the user selection in the previous step. This step, essentially, translates the user's selection into its DOM equivalent.

Finally, in a step 114, the one or more recorded advertising positions in the DOM are translated into instructions for a newly-composed client-side script or for adding to or providing a set of variables for an existing client-side script, wherein the script is for injecting one or more advertisements in the one or more advertising positions, respectively. Step 114 may either be performed by the web browser itself, or by the remote server which receives the recorded one or more advertising positions from the web browser.

Unless specifically stated otherwise, as apparent from present discussions, it is appreciated that throughout the specification discussions utilizing terms such as "processing", "computing", "calculating", "determining", or the like, refer to the action and/or process of a computing system or a similar electronic computing device, that manipulate and/or transform data represented as physical, such as electronic, quantities within the computing system's registers and/or memories into other data similarly represented as physical quantities within the computing system's memories, registers or other such.

Some embodiments may be implemented, for example, using a non-transitory computer-readable medium or article which may store an instruction or a set of instructions that, if executed by a computer (for example, by a hardware processor and/or by any other suitable machine), cause the computer to perform a method and/or operations in accordance with embodiments of the invention. The computer-readable medium or article may include, for example, any type of disk including floppy disks, optical disks, CD-ROMs, magnetic-optical disks, flash memories (such as solid-state drives), read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The instructions may include any suitable type of code, for example, source code, compiled code, interpreted code, executable code, static code, dynamic code, array of parameters or the like, and may be implemented using any suitable high-level, low-level, object-oriented, visual, compiled and/or interpreted programming language and/or scripting language, such as C, C++,C#, Java, Javascript, ECMAScript, PHP, ASP, Ruby on Rails, Perl, machine code, or the like.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method for visually designating one or more placeholders in a web page, the method comprising: providing a client-side script, stored on a remote server, that comprises instructions to a web browser to:
  (i) determine whether the web browser is being used by an administrator or a casual visitor, by at least one of:
  (a) identifying a specific cookie stored in a cookie depository of the web browser, wherein the specific cookie determines that the web browser is being used by an administrator, and a lack of the specific cookie determines that the web browser is being used by a casual visitor,
  (b) identifying a certain IP (Internet Protocol) address associated with the web browser, wherein the certain IP address determines that the web browser is being used by an administrator, and a different IP address determines that the web browser is being used by a casual visitor,
  (c) recognizing a URL (Uniform Resource Locator) parameter as part of a URL of the web site, wherein the URL parameter determines that the web browser is being used by an administrator, and a lack of the URL parameter in the URL of the web site determined that the web browser is being used by a casual visitor, and (d) having a user manually authenticate itself as an administrator, (ii) analyze a tag structure in a source code of a web page being displayed in the web browser, to establish a Document Object Model (DOM) of the web page, (iii) create a Graphical User Interface (GUI) configured to visually designate one or more placeholders, representing user selection of a location in a graphical view of the web page, by at least one of:

(a) an interface which receives a click, by a pointing device, on said location, and overlays a form on the graphical view of the web page, wherein the form enables manual entry of one or more parameters associated with the one or more placeholders, (b) an interface which receives a click, by a pointing device, on an object of the DOM, and overlays a form on the graphical view of the web page, wherein the form enables manual entry of one or more parameters associated with the one or more placeholders, and (c) an interface which receives a user selection of a pre-arranged placeholder layout out of multiple possible placeholder layouts presented to the user, (iv) detect a user selection of a placeholder location in a graphical view of the web page, wherein the user selection is made using the GUI, (v) update the DOM of the web page on the fly, to render the web page and display the one or more placeholders in accordance with the user selection, (vi) compose instructions comprising the designated one or more placeholders for injecting a content element in the location of the user selection, (vii) transmit the instructions to the remote server, and (viii) call a new client-side script from the remote server; embedding or having embedded, within the source code of the web page, a call to the client-side script stored on the remote server; and executing step (i) of the client-side script by the web browser upon the web page being displayed in the web browser, wherein if the web browser is determined to be used by an administrator: executing steps (11) through (vii) of the client-side script, and operating the remote server to compose the new client-side script based on the instructions, and if the web browser is determined to be used by a casual visitor: executing step (viii) of the client-side script, to invoke the content element in the location of the user selection.

2. The method according to claim 1, wherein said executing of the client-side script further comprises receiving from the user one or more parameters pertaining to the content element, said one or more parameters selected from the group consisting of: an advertisement size, an advertisement style, an advertising content, an indication of which pages of the web site the advertisement is to be displayed in, and an advertisement position relative to an element of the DOM.

3. The method according to claim 2, wherein said GUI comprises a parameter interface for enabling the user to define the one or more parameters pertaining to the content element.

4. The method according to claim 3, wherein said GUI comprises the parameter interface displayed adjacent to the selected location.

5. A non-transitory computer readable storage medium having computer-readable code stored thereon, which, when executed by at least one hardware processor, causes said at least one hardware processor to:

provide a client-side script, stored on a remote server, that comprises instructions to a web browser: (i) determine whether the web browser is being used by an administrator or a casual visitor, by at least one of:

(a) identifying a specific cookie stored in a cookie depository of the web browser, wherein the specific cookie determines that the web browser 1s being used by an administrator, and a lack of the specific cookie determines that the web browser is being used by a casual visitor, (b) identifying a certain IP (Internet Protocol) address associated with the web browser, wherein the certain IP address determines that the web browser is being used by an administrator, and a different IP address determines that the web browser is being used by a casual visitor, (c) recognizing a URL (Uniform Resource Locator) parameter as part of a URL of the web site, wherein the URL parameter determines that the web browser is being used by an administrator, and a lack of the URL parameter in the URL of the web site determined that the web browser is being used by a casual visitor, and (d) having a user manually authenticate itself as an administrator, (ii) analyze a tag structure in a source code of a web page being displayed in the web browser, to establish a Document Object Model (DOM) of the web page, (iii) create a GUI for configured to visually designate one or more placeholders, representing user selection of a location in a graphical view of the web page, by at least one of:

(a) an interface which receives a click, by a pointing device, on said location, and overlays a form on the graphical view of the web page, wherein the form enables manual entry of one or more parameters associated with the one or more placeholders, (b) an interface which receives a click, by a pointing device, on an object of the DOM, and overlays a form on the graphical view of the web page, wherein the form enables manual entry of one or more parameters associated with the one or more placeholders, (c) an interface which receives a user selection of a pre-arranged placeholder layout out of multiple possible placeholder layouts presented to the user, (iv) detect a user selection of a placeholder location in a graphical view of the web page, wherein the user selection is made using the GUI, (v) update the DOM of the web page on the fly, to render the web page and display the one or more placeholders in accordance with the user selection, (vi) compose instructions comprising the designated one or more placeholders for injecting a content element in the location of the user selection, (vii) transmit the instructions to a remote server, and (viii) call a new client-side script from the remote server; execute step (i) of the client-side script by the web browser upon the web page being displayed in the web browser, wherein if the web browser is determined to be used by an administrator: executing steps (11) through (vii) of the client-side script, and operating the remote server to compose the new client-side script based on the instructions, and if the web browser is determined to be used by a casual visitor: executing step (viii) of the client-side script, to invoke the content element in the location of the user selection.

6. The non-transitory computer readable storage medium according to claim 5, wherein said executing of the client-side script further comprises receiving from the user one or more parameters pertaining to the content element, said one or more parameters selected from the group consisting of: an advertisement size, an advertisement style, an advertising content, an indication of which pages of the web site the advertisement is to be displayed in, and an advertisement position relative to an element of the DOM.

7. The non-transitory computer readable storage medium according to claim 6, wherein said GUI comprises a parameter interface for enabling the user to define the one or more parameters pertaining to the content element.

8. The non-transitory computer readable storage medium according to claim 7, wherein said GUI comprises the parameter interface displayed adjacent to the selected location.

\* \* \* \* \*